Patented Aug. 3, 1937

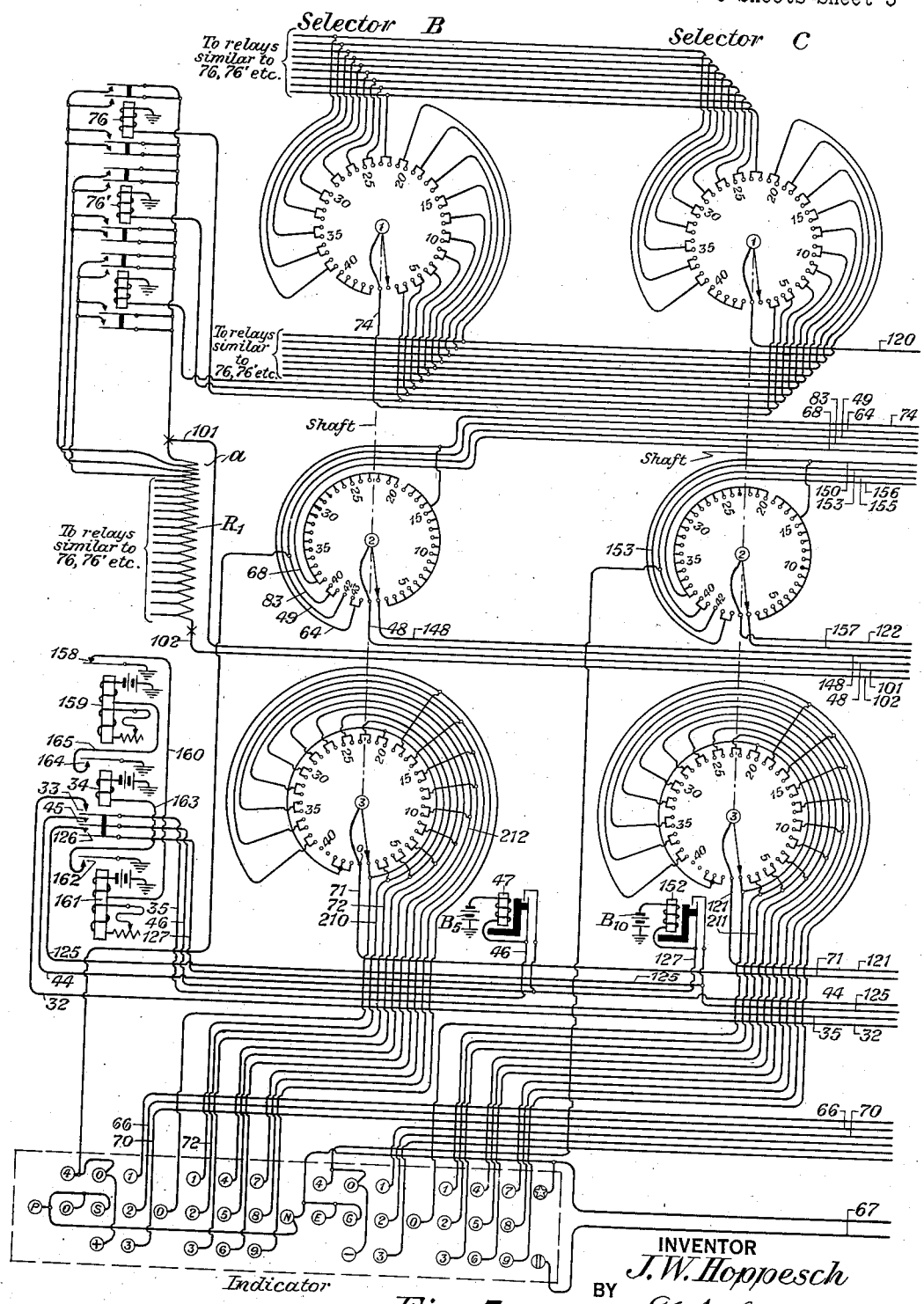

2,088,702

UNITED STATES PATENT OFFICE 2,088,702

TRANSMISSION MEASURING APPARATUS

John W. Hoppesch, Chicago, Ill., assignor to American Telephone and Telegraph Company, a corporation of New York Application September 9, 1936, Serial No. 100,018

17 Claims. (Cl. 179—175.31)

This invention relates to devices for measuring the transmission quality of electrical transmission circuits such as those used in signaling, and particularly to a device for automatically determining the singing point of a circuit in which a repeater is employed.

Heretofore it has been customary, in making transmission measurements upon toll lines, to include in such measurements what is known as the determination of the singing point of such line. In making that measurement the line has been connected to a two-way, two-element repeater, which has then been unbalanced by manual adjustment of its balancing networks until the repeater begins to sing. From the degree of unbalance of the networks when singing begins it is possible to determine, in standard units, the point at which the repeater will begin to sing for the particular toll line connected therewith. Obviously the manual adjustment of those networks needed to produce singing and the reading of the meters and the making of the necessary computation require a given amount of time which limits the number of tests that may be made upon a number of toll lines.

The purpose of the present invention is to eliminate substantially all manual operations in the making of such tests by the provision of means, responsive to the effective connection of a toll line to the measuring device, to automatically vary the adjustable network of the system until singing starts, then to automatically stop the varying means and to instantly indicate the degree of unbalance at which the repeater will sing with a given toll line connected thereto.

Figure 1:
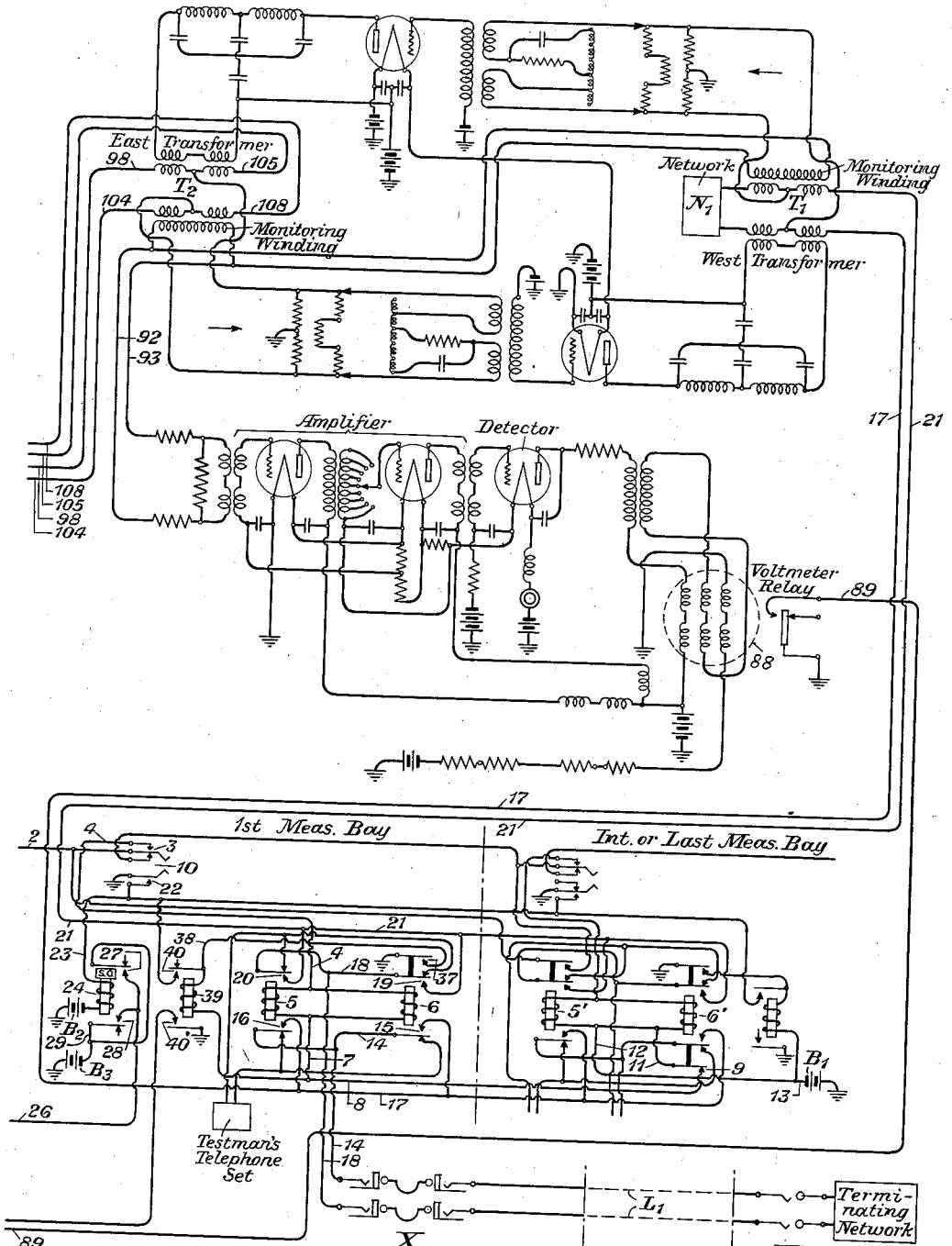
Figure 2:
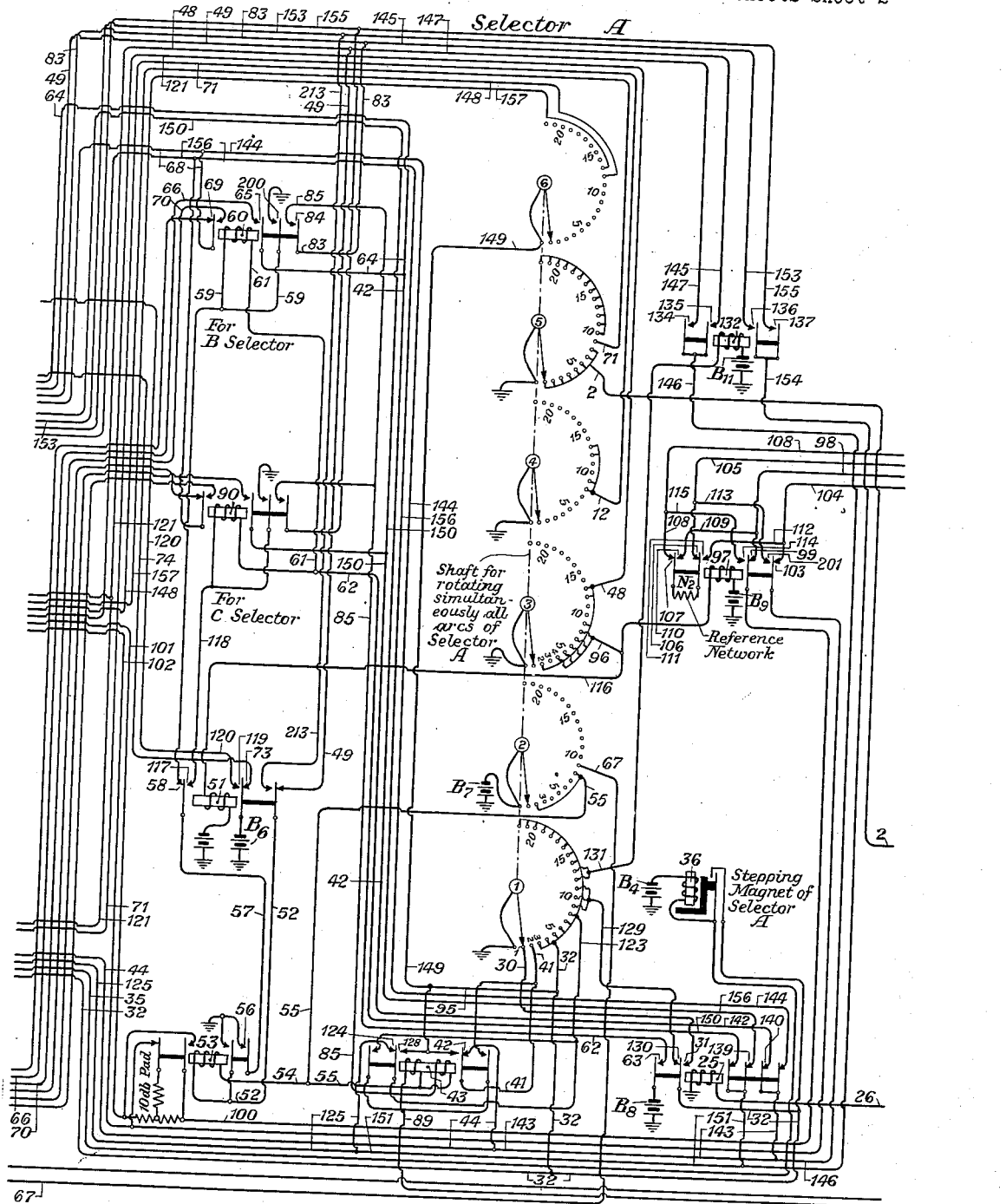

That, and other objects of the invention will be apparent from the following description when read in connection with the attached drawings comprising three figures, each upon a separate sheet which, when arranged so that the left-hand long side of Figure 1 is positioned at the right-hand long side of Fig. 2 so that the correspondingly numbered lines meet; and similarly, when the right-hand side of Fig. 3 is positioned at the left-hand side of Fig. 2, the entire circuit in which the invention is embodied will be shown.

In Fig. 1, $L_1$ represents a toll line extending from the test office at X to a distant office Y, at which it is terminated in a suitable network representing, for example, a 600-ohm subscriber's loop with the receiver off the hook. At office X the toll line is connected by suitable cords to conductors 14 and 18 leading to the apparatus at the transmission measuring board. Those conductors 14 and 18 are normally connected to the testman's telephone set through the contacts of relays 5 and 6, which form part of the lock-out circuit which appears at various positions of the transmission board. Those relays, when operated, disconnect the conductors 14 and 18 from the said telephone set and effectively connect the said conductors, and thereby the line $L_1$, to the west transformer $T_1$ of the 22-type repeater shown at the top of Fig. 1 whenever the key 10 is operated. It is desired to point out that the operation of that key is the only manual operation performed in the determination of the singing point of the circuit comprising line $L_1$ and the said 22-type repeater. The relay 24, forming part of the lock-out circuit, operates upon the operation of key 10, and relay 39 operates after relays 5 and 6 have operated. The purpose of those relays will be fully described hereinafter in connection with the description of the manner in which the circuit functions to make a singing point measurement.

Connected to the transformer $T_1$ is a network $N_1$ which simulates the line $L_1$. Also connected to the transformer $T_1$ across the monitoring winding thereof are the conductors 92 and 93, which lead to the input of the amplifier-detector circuit which functions whenever the repeater begins to sing and causes the operation of relay 88 connected to the output of the said detector. Relay 88, when energized, stops the variation of an adjustable network (which will be described hereinafter), which variation has brought about singing of the repeater, and permits the setting up, upon a visual indicating device, of the degree of unbalance of the networks existing when singing started.

The 22-type repeater is of the conventional type having amplifying elements in each of the one-way branches of the repeater connected therein with requisite transformers and potentiometers, in the manner shown in the figure. Those one-way branches are connected conjugately to the transformer $T_2$, to which are also connected a fixed and a variable network, the fixed network being normally connected by conductors 105 and 108 to the right-hand terminals of transformer $T_2$, and the variable network being normally connected by conductors 98 and 104 to the left-hand terminals of the said transformer. Relay 97, shown on Fig. 2 of the drawings, is provided so that the fixed network $N_2$ may be connected to the left-hand terminals of $T_2$, and in like manner, the variable network to the right-hand terminals of the said transformer.

Referring to Fig. 2 of the drawings, selector A comprises 6 arcs, each having a plurality of contact terminals and a brush, all of said brushes being connected to the same shaft so as to move simultaneously over the said terminals. Associated with the selector A is a stepping magnet 36 which, in cooperation with the interrupter relays, shown at the left-hand side of Fig. 3, serves to cause the rotation of the shaft of selector A, which movement depends upon circuit conditions hereinafter fully described. Relay 25, which is operated by relay 24 of Fig. 1, starts the operation of selector A and in that way inaugurates the process of making the desired measurements. Relay 43 permits the operation of selector B (Fig. 3) and also stops the operation of that selector; and in addition performs other functions. Relay 53 controls the cutting in or the cutting out of a 10 db. pad in the variable network which, as stated, is normally connected across the left-hand terminals of the transformer $T_2$ through the right-hand contacts of relay 97. Relay 60 of Fig. 2 operates in conjunction with selector B (Fig. 3), and relay 90 in conjunction with selector C of that figure. Relay 51 serves in part to operate relays 60 and 90. Relay 132 is part of the circuit for stepping around the selectors B and C to their normal starting position after measurement has been made.

Each of the selectors B and C of Fig. 3 comprises 3 arcs, and the brushes of the arcs of each selector are attached to a common shaft so as to step simultaneously. Arc 1 of selector B controls relays such as 76 which, when operated, serve to shunt out a portion of the resistance $R_1$, which forms a part of the variable network which is effectively connected across the left-hand terminals of transformer $T_2$. At the bottom of Fig. 3 is an indicator which, in the preferred form of the invention, comprises lamps and suitably numbered caps by which the degree of unbalance at the singing point is indicated. The indicator is arranged to show both the positive unbalance and the negative unbalance at the singing point, the term "positive" meaning the unbalance existing with the networks connected to the transformer $T_2$ in the normal fashion, and the term "negative" signifying the unbalance existing when, through the operation of relay 97, the connection of the network $N_2$ and the variable network has been reversed. The positive indications are given at the left-hand side of the indicator and the negative indications at the right-hand side. Each half of the indicator is arranged to show not only the unbalance or loss at the singing point by units from zero to 9, but also by multiples of 10 up to 40, those numbers representing decibels loss. The operation of the lamps representing the units on the indicator is controlled by arc 3 of selector B, and the multiples of 10 up to and including 40 are indicated by the arc 2 of the said selector.

The indications for a negative measurement, that is, for a measurement with the reference network $N_1$ and the variable network reversed at the transformer $T_2$, are controlled by selector C, of which the arc 3 controls the operation of the unit lamps and the arc 2 the multiples of 10. Arc 1 of selector C controls the relays such as 76 which, when operated, shunt portions of the resistance $R_1$. The stepping magnets 47 and 152 operate the selectors B and C, respectively.

The interrupter relays 34, 159 and 161 serve to open and close the circuits of the various interrupter relays at stated intervals in order to effect the stepping around of the brushes of the selectors. Those relays operate in the following manner. A circuit is established from the grounded armature of relay 159 through contact 158, conductor 160, and the upper winding of relay 161 to battery and ground, thereby operating the latter relay and causing the closing of contact 162, which establishes a circuit from ground through contact 162, conductor 163, winding of relay 34 to battery and ground, thereby operating relay 34. That causes the closing of contacts 33, 45 and 126, each of which is connected into a circuit of one of the stepping magnets 36, 47 and 152, respectively. Relay 34 will also close its contact 164, which closes a circuit that includes that contact, conductor 165 and the upper winding of relay 159, together with the grounded battery, thereby operating the latter relay. That results in the opening of contact 158, which releases relay 161 and in turn releases relay 34, thereby opening the contacts 33, 45 and 126. The opening and closing of the latter contacts will cause an opening and closing of the circuits of the stepping magnets, and those magnets will be operated in accordance with the periodicity of operation of relay 34, provided, of course, the circuits of those stepping magnets are closed, which, of course, will depend upon other factors to be later described. Relays 161 and 159 have a low resistance auxiliary winding associated therewith by which the release of those relays may be properly timed. The timing may be controlled by the amount of resistance placed in series with the auxiliary winding.

With the line $L_1$ connected to the measuring equipment at the office X, the testman will operate key 10 which disconnects the testman's telephone set from the line and effectively connects the latter across the right-hand terminals of the transformer $T_1$ of the repeater. That is accomplished in the following manner: The operation of key 10 establishes a circuit from the grounded brush of arc 5 of selector A, resting on terminal 1, which circuit includes conductor 2, contact 3 of key 10, conductor 4, windings of relays 5 and 6, conductors 7 and 8, contact 9 of relay 6', conductors 11, 12 and 13 to the grounded battery $B_1$, which operates relays 5 and 6. The operation of those relays disconnects the said telephone set and establishes a circuit that may be traced from the tip of the upper jack at office X, over conductor 14, contacts 15 and 16 of relays 6 and 5, conductor 17 to the lower right-hand terminal of transformer $T_1$, thence from the upper terminal over conductor 21, contacts 19 and 20 of relays 6 and 5, and conductor 18 to the ring contact of the lower jack at office X, thereby effectively connecting the line $L_1$ to the transformer $T_1$ of the 22-type repeater. The operation of key 10 also brings about the operation of relay 24 by closing the circuit that includes the battery $B_2$, the winding of 24, conductor 23 and contact 22 of key 10. The operation of relay 24 closes a circuit that includes battery $B_3$, contacts 27 and 28, conductor 26 and the grounded winding of relay 25, thereby operating that relay and causing certain effects which will presently be described. Relay 39 of Fig. 1, will be operated upon the operation of relays 5 and 6 by the closing of a circuit that includes contact 37 of relay 6, conductor 38, winding of 39, conductor 8, contact 9 of relay 6', conductors 11, 12 and 13 and grounded battery $B_1$. The closing of the upper contact 40 of relay 39 serves to provide another path to ground for the circuit of relay 24. The closing of the lower contact 40' of relay 39 puts a ground upon certain lamps of the indicator, which lamps include those designated "POS" and "NEG" (being, of course, abbreviations for positive and negative); and also a lamp containing a star which indicates which position is locked up. Those lamps will, of course, be illuminated when the circuit containing them is connected to a grounded battery, which occurs when the brush of arc 2, selector A, rests upon terminal 9 thereof.

Upon the operation of relay 25, of which mention has been made hereinbefore, a circuit will be established from the grounded brush of arc 1, selector A, terminal 1 thereof, contact 31 of relay 25, conductor 32, contact 33 of interrupter relay 34, conductor 35, winding of the stepping magnet 36 of selector A, and the grounded battery $B_4$, which will cause the operation of that stepping magnet and in turn will step the brushes of selector A to terminal 2.

The movement of the brush of arc 1, selector A, to terminal 2 starts the operation of selector B by which, as previously pointed out, the adjustable network is varied and the connections to the numbered lamps of the indicator are established. A circuit will be established from ground on the brush of arc 1, selector A, that includes terminal 2, conductor 41, contact 42 of relay 43, conductor 44, contact 45 of relay 34, conductor 46, winding of stepping magnet 47 and the grounded battery $B_5$. The closing of that circuit causes the brushes of the various arcs of selector B to move from terminal 1 to terminal 2. When brush of arc 1 rests upon terminal 2, a circuit will be established from ground of winding of relay 76 (at the left-hand side of Fig. 3), which circuit includes contact 2 and brush, arc 1, selector A, conductor 74, contact 73 of relay 51 and grounded battery $B_6$, which will cause the operation of relay 76 and shunt out that portion of resistance $R_1$ designated $a$. Resistance $R_1$, as previously pointed out, is connected by conductors 101 and 102 and conductors 100 and 102 to the contacts of relay 97, the connection including the 10 db. pad controlled by relay 53, the combination of resistance $R_1$ and the pad forming the variable network hereinbefore referred to. That entire network is, of course, connected through the contacts of relay 97 and by the conductors 98 and 104 to the left-hand terminals of transformer $T_2$ of the 22-type repeater. It will accordingly be seen that when the section designated $a$ of the resistance $R_1$ is shunted out, the value of that resistance is changed and accordingly the magnitude of the variable network is likewise changed. If that change were sufficient to unbalance the repeater, that is to say, if the difference in magnitude between that variable network and the reference network $N_2$ were sufficiently great to permit the repeater to sing, there would be set up across the monitoring winding of transformer $T_1$ a voltage that would be impressed, by conductors 92 and 93, upon the input of the amplifier-detector circuit. That would result in the operation of relay 88, and accordingly ground would be put upon the circuit that includes conductor 89, left-hand winding of relay 43, conductor 55, terminal 2 and brush of arc 2, selector A, to which battery $B_7$ is connected.

Relay 43 would be operated and the following events would occur. The opening of contact 42 would open the circuit extending from the grounded brush of arc 1, selector A, conductor 41, contact 42, conductor 44, contact 45 of relay 34, conductor 46, winding of stepping magnet 47 and the grounded battery $B_5$, thereby stopping the operation of magnet 47 and in turn stopping the rotation of the brushes of selector B.

The operation of relay 43 closes a circuit that may be traced from ground through the brush and contact terminal 2 of arc 1, selector A, conductor 41, contact 94, conductors 95, 32, contact 33 of relay 34, conductor 35, winding of the stepping magnet 36 and the battery $B_4$ to ground, thereby causing the said stepping magnet to operate and to move the brushes of the various arcs of selector A to the third contact terminal. Relay 43 will be released by the removal of the battery $B_7$ from the circuit of its winding when the brush of arc 2, selector A, moves to the third contact terminal, but the stepping magnet 36 will continue to step the brushes of selector A because the succeeding terminals 3 to 7, inclusive, of arc 1, are together connected to the circuit of the said stepping magnet. Consequently, the brushes of selector A will continue to move until all reach contact terminal 8.

When the brush of arc 3, selector A, reaches terminal 4, a ground will be put upon the circuit that includes conductor 96, the winding of relay 97 and the grounded battery $B_9$. That will cause the operation of that relay and effect a reversal of the networks connected to the terminals of transformer $T_2$, the reference network $N_2$ being thereafter connected to the left-hand terminals of $T_2$ and the adjustable network being connected to the right-hand terminals. The circuit from the left-hand terminals may be traced over conductors 98 and 109, contact 110 of relay 97, network $N_2$, contact 111, conductors 112 and 104 to the other left-hand terminal of $T_2$. The circuit from the right-hand terminals may be traced over conductors 105 and 113, contact 201 of relay 97, conductor 102, resistance $R_1$, conductor 101, the series resistances of the 10 db. pad associated with relay 53, conductor 100, contact 114 of relay 97 and conductors 115 and 108 to the other right-hand terminal of $T_2$. The grounding of terminal 4 or arc 3, selector A, also causes the operation of relay 51. Upon the operation of that relay the battery $B_6$ is connected through contact 119 to the circuit that includes conductor 120, the brush of arc 1, selector C, and the windings of relays 76, 76' whenever the said brush is moved onto contact 2 and the subsequent contacts of arc 1, selector C. Relays 97 and 51 will remain energized while the brush of arc 3, selector A, moves from terminals 4 to 8, since all of those terminals are strapped together and connected to the circuits of the said relays.

As heretofore mentioned, the stepping magnet of selector A is operating throughout the period just mentioned and continues to do so until the brush of arc 1, selector A, moves onto terminal 8. When that occurs ground will be put upon a circuit that includes conductor 123, contact 124 of relay 43, conductor 125, contact 126 of relay 34, conductor 127, winding of stepping magnet 152 and battery $B_{10}$ to ground, thereby causing that stepping magnet to step around the various brushes of the arcs of selector C. When brush of arc 1 of that selector moves onto terminal 2, a circuit will be established from battery $B_6$ that includes contact 119 of relay 51, conductor 120, brush and terminal 2 of arc 1, selector C, and the conductor leading to the grounded winding of relay 76, thereby operating that relay and shunting out a portion $a$ of resistance $R_1$. If that change of resistance does not produce sufficient unbalance to bring about singing of the repeater, the brush of arc 1, selector C, will step onto terminal 3 and then onto terminal 4 (terminals 2 and 3 being strapped together are, of course, equivalent to a single terminal). When the brush rests on terminal 4, relay 76' will be operated, which will effectively shunt out a larger portion of the resistance $R_1$.

Let it be assumed that that adjustment of resistance $R_1$ is sufficient to produce singing by the repeater. The currents resulting in the monitoring winding of the repeater will be impressed upon the input of the amplifier-detector and will operate relay 88, thereby putting a ground on conductor 89, which will cause the operation of relay 43, the operating circuit including battery $B_7$, the brush and terminal 8 of arc 2, selector A, conductor 55, winding of relay 43, conductor 89 to ground. The opening of contact 124 of relay 43 will open the circuit of the stepping magnet 152 of selector C and thereby stop the rotation of the brushes of the arcs of that selector, leaving the brushes of the various arcs upon terminals 4 thereof. The operation of relay 43 will close a circuit from the grounded brush of arc 1, selector A, that includes terminal 8 of that arc, conductor 123, contact 128 of relay 43, conductors 95 and 32, contact 33 of relay 34, conductor 35, winding of stepping magnet 36 and the grounded battery $B_4$, thereby causing the operation of that stepping magnet and thereby stepping around all brushes of seleceter A to their terminals 9.

The movement of the brush of arc 2, selector A, to terminal 9 connects battery $B_7$ to a circuit that includes conductor 67 and one side of the lamps of the indicator. The other side of the circuit of the specific lamps that have operated may be traced from the terminals upon which the brushes of arcs 3 of selectors B and C have rested when those selectors ceased operating. Thus a circuit may be traced from terminal 2 of arc 3, selector B, conductor 210, through unit lamp 1 to conductor 67, thence through the brush of arc 2, selector A, to battery $B_7$ and ground. The other end of that circuit may be traced from brush of arc 3, selector B, through conductor 71 to terminal 9 of arc 5, selector A, to ground. Lamp 1, therefore, will be lighted. In like manner the circuit of the lamp associated with selector C may be traced from terminal 4 over conductor 211 to lamp 2, at the negative end of the indicator, thence over conductor 67 to battery $B_7$ of arc 2, selector A. The other end of that circuit may be traced from the brush of arc 3, selector C, over conductor 121 to terminal 8 of arc 4, selector A, thence to ground upon the brush of that arc.

As pointed out hereinbefore, arcs 2 of selectors B and C control the lamps signifying multiples of 10 upon the indicator, that is, those covering the range from 10 to 40. Since the repeater has been put in a singing condition by unbalances less than 10 db., obviously there will be no indication upon the indicator of the movement of the brushes of arcs 2 of selectors B and C over their terminals. However, in order to show the full scope of operation of this invention, its operation will later be described for the condition where large unbalances are necessary to bring about the singing condition.

After the indications have been set up and noted, it is, of course, necessary to restore the system to the position where it can begin operations anew. When the brushes of arc 5, selector A, passed off its terminal 8 onto terminal 9, it opened the circuit that included the windings of relays 5 and 6, thereby releasing those relays and opening the circuits of relays 24 and 39. The releasing of relay 24 opened the circuit of the winding of relay 25, thereby releasing the armatures of that relay and permitting them to drop back. That operation accordingly closed a circuit that extended from the grounded brush of arc 1, selector A, and included terminal 9, conductor 129, contact 130 of relay 25, conductor 32, contact 33 of relay 34, conductor 35, winding of stepping magnet 36 and the grounded battery $B_4$, thereby causing all brushes of the arcs of selector A to advance to terminal 10. When the brush of arc 2, selector A, passed from terminal 9 to 10, it removed battery from conductor 67 and thereby wiped out the display on the indicator. Since the terminals 9, 10 and 11 of arc 1, selector A, are tied together, the stepping magnet will continue to operate until the brushes of all arcs of selector A have moved onto terminal 12. When the brush of arc 1 of that selector reaches that terminal a circuit will be established that includes conductor 131, relay 132 and battery $B_{11}$, thereby operating the latter relay and closing contacts 134 to 137, inclusive. The passing of the brush of arc 1, selector A, off of terminal 11 caused the stepping magnet 36 to cease operating.

Selectors B and C will be restored to their normal positions in the following manner: A circuit will be established from the grounded brush of arc 3, selector A, that includes terminal 12, conductor 48, brush of arc 2, selector B, terminal 2, conductors 64, 42, contact 140, conductors 143, 44, contact 45 of relay 34, conductor 46, stepping magnet 47 and grounded battery $B_5$, thereby causing the stepping magnet to operate and rotate the brushes of selector B until they pass onto terminal 20. At that point a circuit will be established from the grounded conductor 48 and the brush of arc 2, selector B, which circuit will then include conductors 68 and 144, contact 141 of relay 25, conductors 143 and 44, contact 45 of relay 34, conductor 46 and the winding and battery of the stepping magnet 47, thereby causing the brushes to continue to move over the various contact terminals up to terminal 40. Thereupon a circuit will be established from the grounded conductor 48, terminal 40, conductors 83 and 145, contact 135 of relay 132, conductor 146 and conductors 143 and 44, contact 45 and the winding of the stepping magnet 47, thereby causing the further rotation of the brushes of selector B onto terminal 42. Thereupon a circuit will be established from grounded conductor 48, conductors 49 and 147, contact 134 of relay 132, conductors 146, 143 and 44 to contact 45, thence over conductor 46 to the stepping magnet 47. That will cause the further rotation of the brushes of selector B to conductor 43, whereupon a circuit will be established from grounded conductor 48 and terminal 43, which circuit will include conductors 64 and 142, contact 140 of relay 25 and conductors 143 and 44, contact 45, conductor 46 and stepping magnet 47, thereby causing said stepping magnet to move the brushes of the arcs of selector B onto terminal O and thence onto terminal 1 of each of said arcs. When the brush of arc 3, selector B, passes onto terminal 1, a circuit will be established from grounded conductor 48 that will include conductor 148, contact terminal 12 of arc 6, selector A, conductor 149, conductors 95 and 32, contact 33 of relay 34, conductor 35, the stepping magnet 36 and battery B₄, thereby causing the brushes of selector A to step onto contact terminals 13 of each of its arcs.

The following results occur: Since terminals 12 and 13 of arc 1 are strapped together, relay 132 continues to remain operative and grounds remain upon conductors 48 and 121 through the brushes of arcs 3 and 4, selector A. The ground on conductor 121 likewise grounds conductor 122, which is connected to the brush of arc 2, selector C. Since the brush of that arc rests upon contact terminal 4, a circuit will be established that includes conductor 150, contact 138 of relay 25, conductors 151 and 125, contact 126 of relay 34, conductor 127, stepping magnet 152 of selector C and battery B₁₀, thereby causing the brushes of the various arcs of selector C to step around until brush of arc 2 passes onto terminal 20. Thereupon another circuit will be established from the grounded brush, arc 2, selector C, that will include conductor 156, contact 139 of relay 25, conductors 151 and 125, contact 126 of relay 34, conductor 127 and the stepping magnet 152 and its associated battery, thereby causing the brushes of selector C to step around to terminal 40. Thereupon a circuit will be established from the grounded brush, arc 2, selector C, which circuit includes conductor 155, contact 137 of relay 132, conductors 154, 151 and 125, contact 126, conductor 127 to battery and ground through stepping magnet 152. The brushes are thereupon stepped onto terminal 42 and a circuit is then established from the ground to terminal 42, thence over conductor 153, contact 136 of relay 132, conductors 154, 151 and 125, contact 126, conductor 127 and magnet 152 and battery B₁₀. The operation of the stepping magnet moves the brushes onto contact 43 of arc 2, selector C, whereupon a circuit is established from ground to terminal 43, thence over conductor 150, contact 138 of relay 25, conductors 151 and 125, contact 126, conductor 127 and magnet 152 and battery B₁₀. The brush of arc 2 is thereupon stepped onto terminal O and thence to terminal 1, thereby completing a circuit from the grounded brush through terminal 1 and conductor 157 to terminal 13 of arc 6, selector A, thence over conductors 149, 95 and 32 to contact 33 of relay 34, thence over conductor 35 to magnet 36 and battery B₄. The operation of stepping magnet 36 moves the brushes of selector A onto terminal 14. Since terminal 14 and all subsequent thereto are strapped together and are connected to conductor 32 and thence to the remainder of the circuit of the stepping magnet 36, the said stepping magnet will continue to operate until the brushes of all arcs of selector A have been moved around and are again brought to terminal number 1 of each arc. When the brush of arc 1, selector A, reaches its terminal number 1, the circuit through its stepping magnet 36 will be opened and the rotation of the brushes of selector A will cease. The brushes of all of the selectors will thereupon be upon their number 1 terminals ready to begin operations for another transmission indication.

It is desirable to point out that relays 51 and 97 were restored to their normal unoperated positions when the brush of arc 3, selector A, passed off its terminal 8. Furthermore, relay 132 was released when the brush of arc 1, selector A, passed off its terminal 13.

In order to show the full scope of the invention let it be assumed that the singing point of the tool line is positive 25 db. and negative 24 db. Key 10 would be operated and relays 5, 6, 24, 25 and 39 would in turn operate. The operation of relay 25 would cause stepping magnet 36 to advance the brushes of selector A to their terminals 2 which would, in the manner hereinbefore described, cause the operation of stepping magnet 47 associated with selector B. The operation of the brush of arc 1, selector B, causes the operation of the relays 76, 76', etc., which, as hereinbefore described, shunt out portions of the resistance R₁. Let it be assumed that the repeater does not oscillate even though the brush of arc 1, selector B, has advanced to terminal 39, which, of course, signifies that the network N₂ and the variable network are not sufficiently unbalanced. The brushes will continue stepping and will cause a circuit to be established from the brush of arc 3, selector A, terminal 2, conductor 48 to the brush of arc 2, selector B, terminal 42, conductor 49, contact 50 of relay 51, conductor 52, winding of relay 53, conductors 54 and 55, terminal 2 of arc 2, selector A, and battery B₇ to ground. Relay 53 will thereupon be operated and, by the changes that take place in its left-hand contacts the 10 db. pad will be removed from the variable network. This increases the singing loss caused by the variable network 20 db.

Relay 53 will be locked up over one of the right-hand inner contacts. Through the other right-hand inner contact, namely 56, a circuit is established from ground over conductor 57, contact 58 of relay 51, winding of relay 60, conductors 61 and 62, contact 63 of relay 25 and battery B₈ to ground, thereby operating relay 60. The operation of relay 60 changes the circuit condition so that lamps indicating 20 db. or 30 db. will be lighted to designate losses greater than 19 db. Relay 60, after operation, is locked up by the ground upon conductor 59 at contact 200, and it remains locked up until the display on the indicator has been wiped out and the circuit is to be restored to normal. Since the stepping magnet 47 of selector B is still functioning, the brush of arc 2 of that selector (and likewise the other brushes) will be moved onto terminal 43 and a circuit will be established from the ground on that brush over terminal 43, conductor 64, contact 65 of relay 60, conductor 66 to lamp 2 of that portion of the indicator representing multiples of 10. That signifies a loss of 20 db. and represents the effect of removing the 10 db. pad from the variable network by the operation of relay 53.

If that unbalance is not sufficient to cause the repeater to oscillate, the following changes take place: After the brush of arc 2, selector B, reaches terminal 43 and the unbalance is still insufficient to cause singing of the repeater, the brushes of selector B will continue to rotate and will sweep over their terminals a second time. It is important to point out that the relays 76, 76', etc., are released after the brush of arc 1, selector B, passes onto contact 40 but, at that time, relay 53 has operated and has effectively removed the 10 db. pad so that all that remains of the variable network is the variable resistance R₁. As the brush of arc 1, selector B, again begins to move over terminals 1, 2, etc., relays 76, 76', etc. will be again operated and will shunt out portions of the resistance R₁.

Let it be assumed that when the brush of arc 1, selector B, rests on terminal 10, sufficient resistance shall have been removed from R₁ to cause the repeater to sing. The current induced in the monitoring winding as the result of such singing will be impressed upon the amplifier-detector and will operate relay 88. That will put a ground upon the circuit that includes conductor 89, the left-hand winding of relay 43, conductor 55, terminal 2 of arc 2, selector A, and the grounded battery $B_7$. Relay 43 will be operated and by the opening of contact 42 it will stop the operation of the stepping magnet 47, thereby stopping the rotation of the brushes of selector B. At the same time, through the closing of contact 94 of relay 43, the circuit will be established through the winding of stepping magnet 36 which will cause the brushes of selector A to pass onto terminal 3. Since terminals 3 to 7, inclusive, of arc 1, selector A, are tied together and connected to conductor 32, the stepping magnet 36 will continue to cause the brushes of selector A to step around until they rest upon terminal 8.

It will be recalled that the brushes of arcs 2 and 3, selector B, are now on terminals 10 of those arcs. Respecting arc 2, a circuit will be established from the grounded brush through terminal 10, conductor 64, contact 65 of relay 60, conductor 66 to the lamp 2 at the positive end of the indicator. Respecting arc 3 of selector B, there will be established a circuit from the brush through terminal 10 and conductor 212 to lamp 5 at the positive end of the indicator; that circuit, however, will not be complete since conductor 71, to which the brush is connected, is not closed, and will not be closed until the brush of arc 5, selector A, rests upon contact 9 thereof. As pointed out, however, the brushes of selector B have ceased rotating and the brushes of selector A will begin rotating. After the brush of arc 1, selector A, passes to terminal 3, it will continue to step along until it reaches terminal 8 thereof. As soon as the grounded brush of arc 3, selector A, reaches its terminal 4, relays 97 and 51 will be operated. The operation of relay 97 reverses the reference network $N_2$ and the variable network. The operation of relay 51 establishes a circuit from the battery $B_8$ through contact 63 of relay 25, thence over conductor 62, through the winding of relay 90, conductor 118, contact 117 of relay 51, which circuit will be closed through contact 56 of relay 53 when the latter relay is operated. Relays 51 and 97 remain operated until after the brush of arc 3 passes off terminal 8.

Now when the brush of arc 1, selector A, reaches terminal 8, a circuit is established from that grounded brush through that terminal over a circuit that includes conductor 123, contact 124 of relay 43, conductor 125, contact 126 of relay 34, conductor 127, winding of the stepping magnet 152 and the grounded battery $B_{10}$, thereby causing the brushes of selector C to rotate. The brush of arc 1 will cause the operation of relays 76 and 76' and thereby shunt out portions of the resistance $R_1$. Let it be assumed that all of those portions have been shunted out without causing the repeater to sing. When the brush of arc 2, selector C, reaches terminal 42, a circuit will be established from the ground connection of the brush through terminal 42 and conductors 153 and 213, contact 50 of relay 51, conductor 52, winding of relay 53, conductors 54 and 55 and the brush of arc 2, selector A, and the battery $B_7$, thereby operating relay 53 which locks up through one of its right-hand connections. Through its contact 56 the circuit, as previously traced through winding of relay 90, is completed and relay 90 is operated and locks up through a circuit that includes battery $B_8$, contact 63, conductors 62 and 61, relay 90 and middle right-hand contact. The relays 76 and 76' will be operated by current flowing through a circuit that includes the grounded windings of those relays, the terminals and brush of selector C, conductor 120, contact 119 of relay 51 and battery $B_6$. The operation of relay 53 removes the 10 db. pad from the variable network and thereafter the brushes of selector C begin to move over the terminals a second time.

Let it be assumed that after the brushes move onto terminal 12 the repeater begins to sing. That would put a ground upon conductor 89 at relay 88, which ground would cause the operation of relay 43 by current from the battery $B_7$ connected to the brush of arc 2, selector A, then resting on terminal 8. The operation of relay 43 opens the circuit of the stepping magnet 152 at contact 124 of relay 43 and stops the movement of the brushes of selector C. The operation of relay 43 will again close the circuit of the stepping magnet 36, which circuit extends from the grounded brush of arc 1 through terminal 8, conductor 123, contact 128, conductors 95 and 32, contact 33 of relay 34, conductor 35, the winding of the magnet 36 and battery $B_4$ and will cause the brushes of selector A to step to terminal 9. When the brush of arc 2 stepped onto terminal 9, current from the battery $B_7$ flowed over conductor 67 to one side of the lamps of the indicator. Consequently all lamps, upon both the positive and the negative sides of the indicator, which had been connected to ground through the terminals and brushes of arcs 2 and 3 of selectors B and C would be lighted by the current flowing from battery $B_4$ and through conductor 67 to the said lamps. After the indication has been flashed, the brushes of the various selectors will be stepped around to their initial positions in the manner set forth hereinbefore in describing the mode of operation of the apparatus when singing occurs at relatively small unbalances. Thus the brush of arc 5, selector A, after stepping from terminal 8, would open the circuit through conductor 2, contact 3, conductor 4, relays 5 and 6, conductors 8 to 13 and battery $B_1$, and release those relays and in turn release relays 24, 39 and 25. Consequently, when the brush of arc 1, selector A, steps onto terminal 9, a circuit will be established from that grounded brush to conductor 129, contact 130 and conductor 32, contact 33, conductor 35, the winding of the stepping magnet and battery $B_4$, causing the brushes of selector A to continue to step until the brush of arc 1 passes over terminals 9, 10 and 11 and onto terminal 12. Thereafter relay 132 would operate and the various selectors would return to their initial positions in the manner previously described.

If, however, after a selector has made two complete revolutions and has eliminated not only the 10 db. pad but also the entire resistance $R_1$, without bringing about singing of the repeater, the brush of arc 2 of that selector, upon coming to rest upon its terminal 40, would thereby give an indication of such inability to produce singing in the following manner: Considering, for example, selector B, a circuit would be established from the grounded brush of arc 3, selector A, terminal 2, conductor 48 to the brush of arc 2, selector B, terminal 40, conductors 83 and 86 to the lamps 4, 0 and + at the positive end of the indicator. A circuit would also be established from terminal 40 of arc 2, selector B, over conductor 83, through contact 84 of relay 60, conductor 85, through the winding of relay 43, conductor 55, terminal 2, brush of arc 2, selector A, to the battery and ground, thus operating relay 43. The operation of that relay opens contact 42, thereby stopping the rotation of the brushes of selector B upon the movement of the brushes of selector A to terminal 9, at which point current from the battery $B_7$ connected to the brush of arc 2, selector A, flowing over conductor 67 would cause the illumination of lamps 4, 0 and +, and indicate that the required unbalance of the networks to produce singing was beyond the limits of the apparatus. In similar fashion an indication of 4, 0 and —, for the negative arrangement of the networks would be given whenever the brush of arc 2, selector C, after two cycles of rotation, came to rest upon terminal 40 thereof.

It is to be understood that the invention is not limited to the particular form shown, since it is capable of embodiment in other and different forms without departing from the spirit and scope of the appended claims.

What is claimed is:

1. An automatic singing point measuring apparatus comprising a repeater normally balanced for a given telephone line that may be connected thereto, and means responsive to the connection of said line to said repeater to gradually unbalance said repeater until it begins to sing and thereupon to stop the unbalancing process.

2. The device of claim 1 characterized by means to indicate visually the magnitude of the unbalance when the repeater begins to sing.

3. In a transmission measuring system, the combination with a toll line of a 22-type repeater to which said line is effectively connected, a network, also connected to said repeater and substantially equivalent to said line, a fixed network and a variable network also connected to said repeater at the end opposite to that at which said line and said first mentioned network are connected, and means controlled by the connection of said line to said repeater, to automatically vary the constants of said variable network until the said repeater begins to sing.

4. The system of claim 3 characterized by the inclusion of means, controlled by the singing currents, to stop the said automatic varying means of the said variable network when the said repeater begins to sing.

5. In a transmission measuring system, the combination with a toll line of a 22-type repeater to which said line may be connected, a network also connected to said repeater and simulating electrically the said line, a fixed network and a variable network also connected to said repeater and capable of balancing said repeater to prevent singing thereof, and means, automatically responsive to the effective connection of said line to said repeater to set in operation means to vary the magnitude of the variable network, and means to stop such varying as soon as said repeater begins to sing.

6. In a transmission measuring system, the combination with a transmission line of a repeater normally balanced when said line is connected thereto, means responsive to the connection of said line to said repeater to unbalance said repeater to the singing point and means to automatically indicate the degree of unbalance necessary to effect that result.

7. In a system for measuring the singing point of a repeater to which a telephone line may be connected, the combination with a 22-type repeater of a telephone line adapted to be connected thereto, a network to balance said line, a fixed network and a variable network also connected to said repeater, the relation of said line and all of said networks being such that the repeater is normally balanced, a control circuit responsive to the connection of said line to said repeater to unbalance said repeater and thereby to cause it to sing.

8. In a system for measuring the singing point of a repeater to which a telephone line may be connected, the combination with a 22-type repeater of a line adapted for connection therewith, a network simulating said line and connected to said repeater, a fixed network and a variable network, all of said networks and said line being so proportioned that the said repeater will not sing, switching means to connect said line to said repeater, a plurality of selectors each having a stepping magnet associated therewith, a relay responsive to said switching means to operate the stepping magnet of the first selector, means controlled by said first selector to operate the stepping magnet of a second selector and means controlled by the second selector to cut out successive parts of said variable network until the repeater is sufficiently unbalanced as to sing.

9. The system of claim 8 characterized by the addition of means connected to said repeater to amplify and rectify a portion of the current resulting from singing, a relay responsive to the rectified current and a second relay responsive to the operation of the first mentioned relay to stop the operation of said second selector when singing begins and to again set in operation the said first selector.

10. In a system to determine the singing point of a repeater to which a telephone line may be connected, the combination with a repeater of a telephone line adapted to be connected thereto, a network to balance said line, a fixed network and a variable network also connected to the said repeater, the said variable network comprising a pad of fixed magnitude and a variable impedance, a first selector responsive to the connection of said telephone line to said repeater to set in operation a second selector, switching means controlled by the second selector to cut out successive parts of the said variable impedance, and a relay, operable whenever said switching means has effectively cut out all of said variable impedance without producing singing, to effectively remove said pad from the said variable network.

11. The system of claim 10 characterized by the inclusion of means to effect further rotation of said second selector and a second variation of the said variable impedance after the said pad has been removed from the network.

12. An automatic singing point measuring apparatus comprising a repeater normally balanced for a given telephone line connected thereto, means responsive to the connection of the said line to the said repeater to gradually unbalance said repeater until it begins to sing and thereupon to stop the unbalancing process, and means to restore the measuring apparatus to its initial position for the making of a new measurement.

13. An automatic singing point measuring apparatus comprising a repeater normally balanced for a given telephone line connected thereto, means responsive to the connection of the said line to the said repeater to gradually unbalance said repeater until it beings to sing and thereupon to stop the unbalancing process, means to indicate visually the magnitude of the unbalance when the repeater begins to sing, and means to restore the measuring apparatus to its initial position for the making of a new measurement.

14. In a transmission measuring system, the combination with a toll line of a 22-type repeater to which said line is effectively connected, a network also connected to said repeater and substantially equivalent to the said line, a fixed network and a variable network also connected to the said repeater at the end thereof opposite to that at which the said line and the said first-mentioned network are connected, means controlled by the connection of the said line to the said repeater to automatically vary the constants of the said variable network until the repeater begins to sing, means responsive to the singing currents to stop the automatic varying means, and means to indicate the degree of unbalance of the said fixed and the said variable networks existing when singing begins.

15. In a system for measuring the singing point of a repeater to which a telephone line may be connected, the combination with a 22-type repeater of a line adapted for connection therewith, a network simulating the said line and connected to the said repeater, a fixed network and a variable network, all networks and also the said line being so proportioned that the said repeater will not sing, switching means to connect the said line to the said repeater, a plurality of selectors each having a stepping magnet associated therewith, a relay responsive to the said switching means to operate the stepping magnet of the first selector, means controlled by the first selector to operate the stepping magnet of a second selector, means controlled by the second selector to cut out successive parts of the said variable network until the repeater is sufficiently unbalanced as to sing, means to amplify and rectify the singing current, a relay responsive to the rectified current, a second relay responsive to the operation of the first-mentioned relay to stop the operation of the second selector when singing begins and to set in operation again the first selector, a third relay, controlled by the said first selector, to reverse the relative positions of the said fixed and the said variable networks with respect to the said repeater, and a third selector, responsive to the operation of the first selector, to vary the magnitude of the variable network until the repeater again begins to sing.

16. The system of claim 15 characterized by the rectification of part of the singing current and the operation of the said second relay to stop the operation of the said third selector when singing begins, and means controlled by the said first selector to produce a visual indication of the magnitude of the unbalance required to produce singing for both the normal and the reversed positions of the fixed and the variable networks.

17. In a system for measuring the singing point of a repeater to which a telephone line may be connected, the combination with a 22-type repeater of a line adapted for connection therewith, a network simulating the said line and connected to the said repeater, a fixed network and a variable network, all networks and also the said line being so proportioned that the said repeater will not sing, switching means to connect the said line to the said repeater, a plurality of selectors each having a stepping magnet associated therewith, a relay responsive to the said switching means to operate the stepping magnet of the first selector, means controlled by the first selector to operate the stepping magnet of a second selector, means controlled by the second selector to cut out successive parts of the said variable network until the repeater is sufficiently unbalanced as to sing, means to amplify and rectify the singing current, a relay responsive to the rectified current, a second relay responsive to the operation of the first-mentioned relay to stop the operation of the second selector when singing begins and to set in operation again the first selector, a third relay controlled by the said first selector, to reverse the relative positions of the said fixed and the said variable networks with respect to the said repeater, and a third selector, responsive to the operation of the first selector, to vary the magnitude of the variable network until the repeater again begins to sing, means to rectify the singing current and to apply the rectified current to the aforesaid second relay to stop the operation of the third selector, means controlled by the first selector to produce a visual indication of the magnitude of the unbalance existing when singing begins for both the normal and the reversed positions of the fixed and the variable networks, and means to effect a stepping around of all selectors to their initial positions after singing point measurements for a given line have been completed.

JOHN W. HOPPESCH.